Dec. 17, 1968   D. F. SMITH   3,416,403
ANTIMINE WEAPON

Filed Feb. 17, 1959   2 Sheets-Sheet 1

INVENTOR.
DONALD F. SMITH
BY

*L. M. Smith, Jr.*
ATTORNEYS

Dec. 17, 1968     D. F. SMITH     3,416,403
ANTIMINE WEAPON
Filed Feb. 17, 1959     2 Sheets-Sheet 2
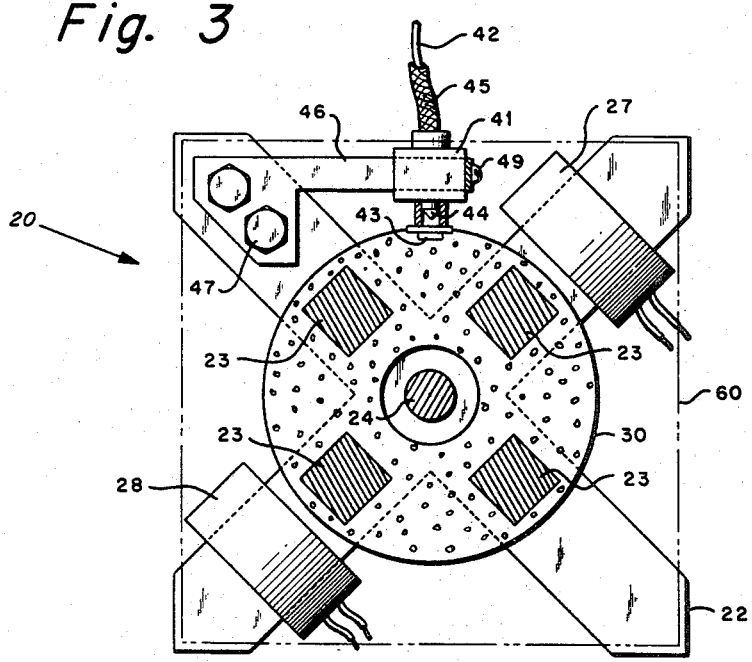
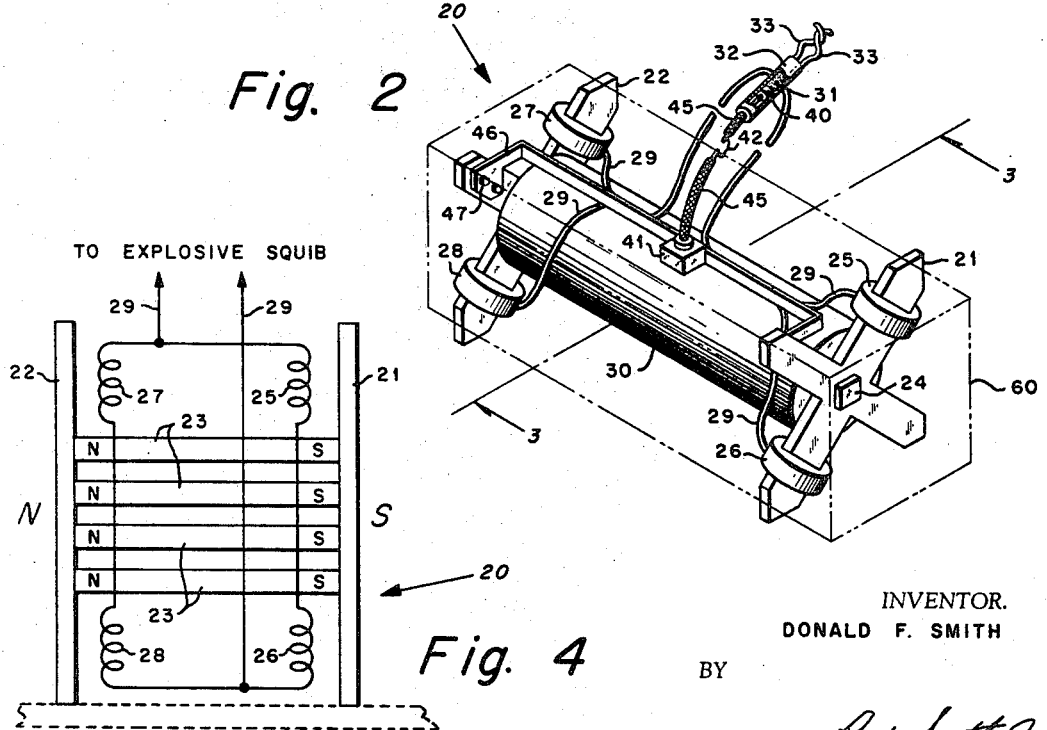
INVENTOR.
DONALD F. SMITH

3,416,403
ANTIMINE WEAPON
Donald F. Smith, Center Square, Pa., assignor to the United States of America as represented by the Secretary of the Navy
Filed Feb. 17, 1959, Ser. No. 793,939
3 Claims. (Cl. 89—1)

The invention described herein may be manufactured and used by or for the Government of the United States of America for governmental purposes without the payment of any royalties thereon or therefor.

This invention relates to an antimine weapon, and more particularly to a method of detecting and destroying mines and the apparatus therefor.

One of the problems associated with detecting and destroying mines is that in recent decades there has been developed a multitude of different types of mines which function differently and which consist of a considerable number of different configurations. Also, the mines may be located in different places in a body of water. Therefore, one of the problems associated with devoloping a mine sweeper which will be operative against all types of mines is to determine a common denominator among the mines that can be used for clearing the seas of them. This will include mines which are cabled or anchored to the bottom of the water as well as mines which float or are submerged at different depths.

Obviously, it is highly uneconomical to develop several methods of detecting and destroying mines, each of the methods not being capable of detecting all the various types of mines. As a result, repetitive or multiple mine sweeping operations are required in order to clear water lanes of the mines. For example, some of the methods and the apparatus for effecting the same are designed to be effective against only magnetic mines. Other sweepers combat against only physical contact type mines. One of the methods is known as the paravane type which employs a cable cutting apparatus towed by a surface vessel. This method is effective against extended cable anchored mines that are anchored just beneath the water surface. After the cable is severed, the mines float to the surface and are subsequently destroyed by the use of high powered rifles. The above know mine sweeping methods all involve the use of a surface vessel and hence present a constant hazard to the surface vessel so used.

The present invention contemplates a method of wider scope of effectiveness in that it deals with a feature common to all presently known types of mines, namely the ferromagnetic material of the mines. Also it is desirable, in order to eliminate hazards to surface vessels, to provide an aircraft, such as a helicopter, as a towing craft.

Therefore, one of the principal objects of the invention is to provide a method of detecting and destroying mines that can be used effectively without danger to the towing craft, or the personnel associated therewith against all known types of antisurface vessel or antisubmarine types of mines.

Another object of the invention is to provide a method of detecting and destroying mines which is operative to not only locate the mines but to automatically destroy the same.

Another object of the invention is to provide a method of detecting and destroying mines which method is effective against all mines having a common denominator, such as a substantial ferrous content in each of the mines.

Yet another object of the invention is to provide a towing arrangement which will not only be effective for locating and destroying mines anchored to the bottom of a body of water but which arrangement is also useful against mines which may be below the surface of the water, the object being to locate and actually destroy the mine and not to just cut a mine free from its anchoring cable, if any.

Yet another object of the invention is to provide a method of detecting and/or destroying mines, which method is relatively simple, of low cost, easily replaceable, and can be operated without hazard to the personnel involved.

Still another object of the invention is the provision of an antimine weapon, referred to as a magnetic leech device which is capable of being attracted to and attaching itself to any type of mine having a substantial iron content for locating and/or destroying the mine.

Still another object of the invention is to provide a leech device having magnetic means for the attraction thereof to a mine having a substantial ferrous content for automatically destroying the mine, preferably after a predetermined length of time has elapsed.

Still another object of the invention is to provide an antimine type of weapon employing assemblies each including a permanent magnet arrangement and a demolition charge adapted to be detonated by the shorting out of the North and South poles of the permanent magnet arrangement resulting in the formation of a keeper circuit therewith, wherein each assembly is arranged to be magnetically attracted to a mine having a substantial ferrous content, cling to the outer surface of the mine and destroy the same when the ferrous content of the mine is of sufficient magnitude to provide a keeper effect for shorting out the North and South poles of the permanent magnet arrangement portion of the assembly, firing the demolition charge, and thereby destroying the mine.

Still another object of the invention is to provide an antimine weapon, as set forth in the preceding object, which weapon needs not be supplied with electrical energy from an outside source but which depends upon the cutting, the shorting out, or the collapsing of the magnetic lines of flux between the opposite poles of the permanent magnet for creating a voltage in a circuit of the antimine weapon and exploding the demolition charge, which destroys the mine.

Still another object of the invention is to provide a new and novel method for detecting and destroying antisurface vessel and/or antisubmarine mines having a substantial ferrous content, the method comprising the utilization of a gang of depth control surfaces for clearing a lane through a mined body of water with one or more laterally spaced apart antimine weapons, referred to as magnetic leeches, capable of seeking out and destroying the mines, the depth of the ganged control surfaces being manually or automatically controlled.

Another object is to provide a method, as set forth in the preceding object, in which the leeches are suspended in laterally spaced apart relationship from the ganged submerged depth control surfaces so that the leeches are magnetically attracted to mines disposed therebeneath.

The invention further provides certain novel features of construction, combinations and arrangements of parts, and further objects and advantages thereof will be apparent to those skilled in the art to which it pertains from the following description of the presently preferred embodiment thereof described with reference to the accompanying drawings in which similar reference characters represent corresponding parts throughout the several views, and in which:

FIG. 2 is a generally pictroial view of a portion of the invention comprising a magnetic leech device;

FIG. 3 is a sectional view of the leech device along line 3—3 in FIG. 2; and

FIG. 4 is a schematic electrical diagram for illustrating the electrical system employed in the leech device.

Figure 1:
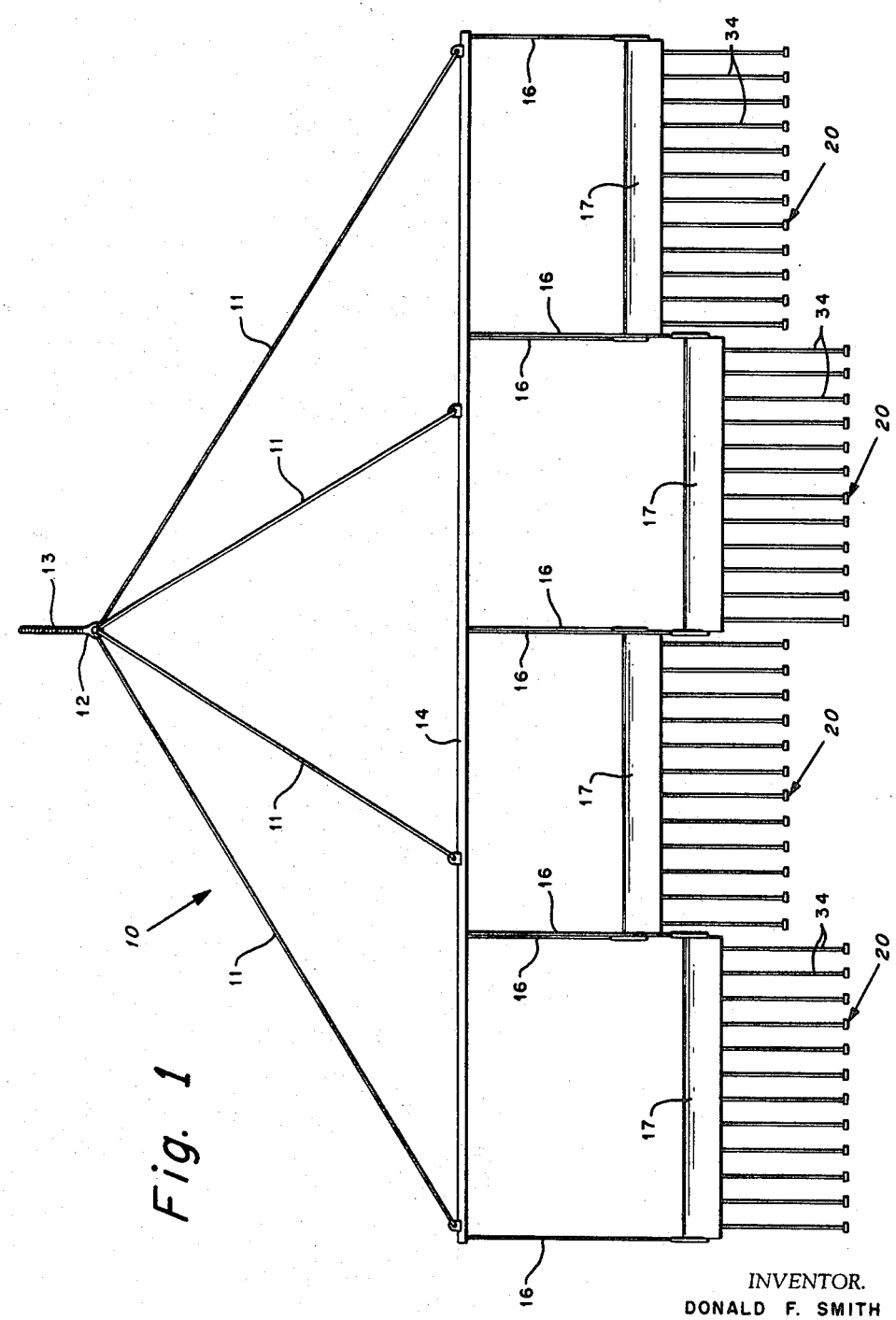
FIG. 1 is a generally pictorial view of an antimine weapon embodying the invention, the weapon preferably being towed by an aircraft, such as a helicopter.

It is to be understood that the invention is not limited to the details of construction and arrangements of parts shown in the drawings and hereinafter described in detail but is capable of being otherwise embodied and of being practiced or carried out in various ways. It is to be further understood that the phraseology or terminology employed herein is for the purpose of description and there is no intention to herein limit the invention beyond the requirements of the prior art.

Referring to FIG. 1, the antimine weapon or mine sweeping apparatus, indicated generally by the reference numeral 10, embodying the invention, is comprised of a plurality of flexible lines 11 connected to a point 12 to a main tow line 13 depending from a towing craft, such as a helicopter, not shown. The other ends of the flexible lines 11 are connected at laterally spaced points to a transversely extending tow bar 14. The skeleton-like structure of the antimine or mine sweep apparatus is further comprised of light, flexible drag lines 16, for the purpose of towing four depth control surfaces or hydrofoils 17 through a body of water. The drag lines are connected at laterally spaced points along the tow bar 14. The training ends of two drag lines 16 are connected to opposite ends of one depth control surface 17.

Each control surface 17 is of a generally elongated construction and is used to control the depth of a plurality of magnetic leech devices, indicated generally by the reference numeral 20. Preferably each control surface 17 is approximately 25 feet long and is provided with twelve of the devices 20 spaced approximately two feet apart. The control surfaces 17 are staggered in the direction of tow so that the juxtaposed ends thereof are slightly overlapping or at least aligned for clearing a transversely uninterrupted submarine or shipping lane in the water. Preferably, the control surfaces 17 are alternately aligned in two parallel rows which are spaced sufficiently apart to avoid entanglement and interference with each other. Further details as to the construction and the control of each of the control surfaces or planes 17 may be had by referring to a copending application Ser. No. 793,938 filed Feb. 17, 1959, now Patent No. 3,062,171, for a "Wing Tip Tow" by James Somerville. However, it will be understood that other types of apparatus can be used for controlling the depth of the control surfaces 17 above the ocean bottom or beneath the surface of a body of water. For example, floats of various density have been known to be used for maintaining apparatus at a desired depth. The use of these and other depth control means are contemplated in this invention in lieu of the control surfaces 17.

Each of the leech devices 20, illustrated in detail in FIGS. 2 and 3, seeks out and is attracted to mines having a substantial content of magnetic material, such as ferromagnetic material.

More particularly, each leech device 20 is comprised of two end plates 21, 22, preferably of a magnetic material such as a ferromagnetic material, spaced apart by four parallel permanent magnets 23 with poles aligned so as to have the North N and South S poles each at discrete ends thereof. More particularly, the end plates 21, 22, are respectively connected to the North and South poles of the magnets 23, FIG. 4. The end plates 21, 22, are each in the shape of a Maltese cross with the outer extremities thereof being pented so as to form apices. The end plates 21, 22 and the magnets 23 are held in assembly by means of a central, longitudinally or axially extending bolt 24 having a suitable fastening means such as a nut, not shown, at the threaded end thereof. The magnets 23 are encased within a cylindrically-shaped mass of explosive charge 30 between the end plates 21, 22.

Two induction coils 25, 26 are disposed about and secured to a pair of the oppositely extending legs of the end plate 21. Similarly, two induction coils 27, 28 are disposed about and secured to a pair of the oppositely extending legs of the end plate 22. Two electrically conducting wire leads 29 extend from across the closed loop, series connected coils 25, 26, 27, 28 to a squib 31, FIGS. 2 and 4. The squib 31 is housed within a generally cylindrical or cup-shaped frangible element 32 having an eye ring 33 preferably formed by two separate semicircular interhooked wires at the outer and closed end thereof. The semicircular wires of the ring 33 are interhooked so that upon the destruction of the squib 31 and the element 32 the wires will part and fall away from a hooked lower end of the streamer rod 34 to which it is adapted to be connected. Each of the depth control surfaces 17 are adapted to have twelve streamer rods 34, each trailing or carrying a leech device 20 and attached thereto at two foot intervals, FIG. 1. As a result, a lane of uniform width can be cleared with the skeleton-like towing arrangement schematically shown in FIG. 1.

The firing of the squib 31 is caused by the physical attraction and the attachment of the leech device 20 to a mine, not shown, having a substantial content of magnetic material. In most instances, the device 20 must come into actual physical contact with the metallic outer surface of a mine before the squib 31 is fired and the charge 30 is detonated. The mine's outer surface is generally comprised of a ferromagnetic material capable of readily transmitting magnetic lines of flux, but is not such a good conductor as to be nonmagnetic which would cause the device to fail to operate. As the leech device 20 is attracted to the mine, there must be sufficient ferromagnetic material in the mine so as to provide a keeper effect for shorting out the North and South poles 21 and 22 of the leech device 20. The sudden collapse of flux lines created by the voltage induced in the coils 25, 26, 27, 28, FIG. 4, will result in a voltage differential and current of sufficient magnitude will flow through the coil leads 29 to fire the squib 31. The shorting out of the magnetic lines of flux between the end plates 21 and 22 and the subsequent firing of the squib 31 causes a piston 40 to be driven outwardly of the cup-shaped housing 32 for actuating a timer 41 by means of an interconnecting flexible shaft 42 and subsequently detonating a percussion cap 43, FIG. 3, imbedded in the explosive 30.

More particularly, the protective flexible wire shield 45 enclosing and closely encircling the flexible shaft 42 and interconnecting housing 32 and timer 41 acts to constrain the housing 32 relative to the timer 42 so that displacement of one end of shaft 42 responsive to displacement of piston 40 produces the requisite actuating movement of the other end of the shaft 42 relative to the timer 41.

The timer assembly 41 may comprise any suitable conventional timing mechanism. For example, it may include an escapement mechanism (not shown) set in motion by the movement of the end of shaft 42 toward the timer 41, as described above. After a predetermined amount of time, controlled by the escapement mechanism, has elapsed, a sear (not shown) is released and the spring loaded firing pin 44, FIG. 2, is free to strike the percussion cap 43.

The assembly of the timer 41 and the firing pin 44 is held in position by means of a nonmagnetic bracket 46 of generally U-shaped configuration, the bracket 46 having the parallel end legs thereof rigidly secured to parallel and opposed legs of the end plates 21, 22 by suitable fastener means such as bolts 47. Preferably, the bracket 46 is plastic. The timer 41 is enclosed in a housing which is rigidly secured to the intermediate portion of the bracket 46 by suitable fastener means such as a screw 49. The housing of the timer 41 supports a guide sleeve 50 which encloses and guides the firing pin 44 to the percussion cap 43. Immediately upon the firing of the squib 31, the frangible housing 32 is burst or fractured so that the eye ring 33 which is attached to a streamer rod 34 is parted in the manner described above and the leech device 20 is released from its streamer rod 34.

Simultaneously with the bursting of the housing 32 caused by the firing of the squib 31, the piston 40 by means of the flexible shaft 42 energizes the timer 41 which subsequently releases the firing pin 44. The firing pin 44 then strikes the detonator cap 43 and detonates the explosive charge 30.

Preferably the leech 20 is encased in a water-proof plastic mold outlined with dotted lines and indicated by the reference numeral 60 for the purpose of water-proofing the device 20. However, the end plates 21 and 22 are not completely encased by the plastic casing 60 and the outer ends of the end plates 21, 22 will remain exposed. It is also contemplated that the bracket 46 could be dispensed with and the timer 41 can be held in place by the casing 60. Also, the streamer rods 16, which are hook-shaped, are preferably made of stainless steel, which is not only nonmagnetic but is also rust resistant. Similarly, the control surfaces 17 are made of a nonmagnetic and corrosive resistant material, such as aluminum.

A nondestructive application of the invention resides in the utilization of a releasable float or dye marker to pinpoint the location of an underwater object having a substantial magnetic content, such as iron. This would be of considerable benefit in locating sunken vessels or in submarine warfare. For example, a water soluble dye, such as fluorescein, can be packaged within the mold 60 in substantially the same cylindrical mold as the explosive charge 30 and upon the percussion cap 43 being fired, the plastic casing 60 would be blasted away sufficiently to permit the dye to be released therefrom. The dye will then mark the location of the underwater object.

While a specific embodiment has been shown and described in accordance with the invention, it is understood that the same is susceptible of many changes and modifications as known to a person skilled in the art and it is intended to cover all such changes and modifications coming within the scope of the appended claims.

What is claimed is:

1. An apparatus for clearing mines from a water lane for submarines and surface vessels, comprising in combination: an elongated rigid control surface formed to sustain itself submerged in water while towed therethrough, means adapted to be connected to a towing craft and connected to said control surface on one side in such a manner that the motion imparted to said control surface is normal to the ends thereof, a plurality of elongated streamer rods depending from another side of said control surface at equally spaced intervals over the length of said control surface for combing the water lane defined by the extension of said streamer rods and the area traversed by said control surface, and a plurality of self-releasing elements respectively connected to the freely depending ends of said rods, each of said self-releasing elements comprising a permanent magnet structure adapted to engage and remain affixed to an object containing a substantial quantity of magnetic material, electrically energized detonating means secured to said permanent magnet structure, and circuit means electrically coupled to said permanent magnet structure and to said detonating means to be operative to energize said detonating means when said permanent magnet structure becomes affixed to said object.

2. An apparatus for clearing mines from a water lane for submarines and surface vessels, comprising in combination: an elongated hydrofoil formed to sustain itself submerged in water while towed therethrough, means adapted to be connected to a towing craft and connected to said hydrofoil on one side in such a manner that the motion imparted to said hydrofoil is normal to the ends thereof, a plurality of elongated streamer rods depending from another side of said hydrofoil at equally spaced intervals over the length of said hydrofoil for combing the water lane defined by the extension of said rods and the area traversed by said hydrofoil, a plurality of mine destroyers respectively connected to the freely depending ends of said rods, and means responsive to substantial contact of a mine with any one of said mine destroyers for releasing said one mine destroyer from its respectively connected rod, each of said mine destroyers comprising a permanent magnet structure adapted to engage and remain affixed to an object containing a substantial quantity of magnetic material, electrically energized detonating means secured to said permanent magnet structure, and circuit means electrically coupled to said permanent magnet structure and to said detonating means to be operative to energize said detonating means when said permanent magnet structure becomes affixed to said object.

3. An apparatus for clearing of mines from a water lane for submarines and surface vessels, comprising in combination: a plurality of elongated rigid control surfaces formed to sustain themselves independently of each other submerged in water while towed therethrough, an elongated rigid tow bar, a plurality of members connected between said tow bar and said control surfaces for maintaining the latter juxtaposed at their ends and parallel to said tow bar when said members are fully extended, means adapted to be connected to a towing craft and connected to said tow bar on one side in such a manner that the motion imparted to said control surfaces through said members is normal to the ends of said control surfaces, a plurality of elongated streamer rods depending from another side of said control surfaces at equally spaced intervals over the length of each of said control surfaces for combing the water lane defined by the extension of said members and the area traversed by said control surfaces, a plurality of mine destroyers respectively connected to the freely depending ends of said rods, and means responsive to substantial contact of a mine with any one of said mine destroyers for releasing said one mine destroyer from its respectively connected rod, each of said mine destroyers comprising a permanent magnet structure adapted to engage and remain affixed to an object containing a substantial quantity of magnetic material, electrically energized detonating means secured to said permanent magnet structure, and circuit means electrically coupled to said permanent magnet structure and to said detonating means to be operative to energize said detonating means when said permanent magnet structure becomes affixed to said object.

References Cited
UNITED STATES PATENTS

| | | | |
|---|---|---|---|
| 322,900 | 7/1885 | Castro | 102—18 |
| 1,094,700 | 4/1914 | Bundgens | 114—235 |
| 2,879,737 | 3/1959 | Gorton | 114—235 |
| 2,436,394 | 2/1948 | Maltby et al. | 102—18 |
| 2,792,782 | 5/1957 | Schiller | 102—18 |
| 1,305,483 | 6/1919 | Matsumura | 114—235.2 |
| 1,344,074 | 6/1920 | Williams | 114—235.2 |
| 2,379,447 | 7/1945 | Lindsey | 102—18 X |
| 1,358,360 | 11/1920 | Burney | 114—235.2 |
| 2,935,943 | 5/1960 | Stimler | 102—18 |

SAMUEL W. ENGLE, *Primary Examiner.*

U.S. Cl. X.R.

114—235; 102—18